US010169741B2

(12) United States Patent
Garrick et al.

(10) Patent No.: US 10,169,741 B2
(45) Date of Patent: Jan. 1, 2019

(54) PROVIDING GEOLOCATION NOTIFICATIONS TO INCREASE COLLABORATION BETWEEN USERS

(71) Applicant: International Business Machines Corporation, Armonk, NY (US)

(72) Inventors: Gloria B. Garrick, Charlotte, NC (US); Matthew T. Hamann, Matthews, NC (US); Anne E. Kline, Endwell, NY (US); Christopher D. Moore, Charlotte, NC (US); Travis J. Workman, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 15/448,921

(22) Filed: Mar. 3, 2017

(65) Prior Publication Data

US 2017/0178083 A1    Jun. 22, 2017

Related U.S. Application Data

(63) Continuation of application No. 14/154,235, filed on Jan. 14, 2014, now Pat. No. 9,647,920.

(51) Int. Cl.
*G06Q 10/10* (2012.01)
*H04L 29/08* (2006.01)
(Continued)

(52) U.S. Cl.
CPC ......... *G06Q 10/1095* (2013.01); *G06Q 50/00* (2013.01); *H04L 43/10* (2013.01);
(Continued)

(58) Field of Classification Search
CPC .... G06Q 10/1095; G06Q 50/01; H04L 67/24; H04L 67/18
See application file for complete search history.

(56) References Cited

U.S. PATENT DOCUMENTS 8,243,897 B2    8/2012  Groth
8,312,112 B2   11/2012  Stremel et al.
(Continued)

OTHER PUBLICATIONS

Advances in Location-Based Services, 2012, Springer, pp. 37-53.*
(Continued)

*Primary Examiner* — Chris Parry
*Assistant Examiner* — Soe M Hlaing
(74) *Attorney, Agent, or Firm* — Daniel R. Simek; Madeline F. Schiesser; Keohane & D'Alessandro PLLC (57) ABSTRACT

Embodiments herein provide geolocation notifications to increase collaboration between users. Specifically, a collaboration tool is configured to receive, from a social media application, an indication of a geolocation of a first user, as well as information about an availability of the first user and an availability of a second user. These are used to generate a collaborative meeting event for the first user and the second user according to the geolocation of the first user, the availability of the first user, and an availability of the second user. The second user is presented with content based on a next-best-action (NBA) model from which the second user selects content to present to the first user, which is then configured for the first user. As such, the collaboration tool unifies user geolocation and availability information in order to connect interested users with one another in a mutually beneficial way.

20 Claims, 6 Drawing Sheets

(51) Int. Cl.
*H04L 12/26* (2006.01)
*G06Q 50/00* (2012.01)

(52) U.S. Cl.
CPC .............. *H04L 67/18* (2013.01); *H04L 67/24* (2013.01); *G06Q 50/01* (2013.01)

(56) References Cited

U.S. PATENT DOCUMENTS

| | | | |
|---|---|---|---|
| 8,326,315 | B2 | 12/2012 | Phillips et al. |
| 8,326,668 | B2 | 12/2012 | Basson et al. |
| 8,332,315 | B2 | 12/2012 | Tullis |
| 8,332,471 | B2 | 12/2012 | Harple et al. |
| 2003/0078033 | A1* | 4/2003 | Sauer ................ H04M 1/72552 455/412.1 |
| 2008/0059576 | A1* | 3/2008 | Liu ........................ G06Q 10/10 709/204 |
| 2008/0140520 | A1* | 6/2008 | Hyder .................. G06Q 20/342 705/14.1 |
| 2009/0106077 | A1 | 4/2009 | Bhogal et al. |
| 2009/0254840 | A1 | 10/2009 | Churchill et al. |
| 2010/0325214 | A1 | 12/2010 | Gupta |
| 2011/0004501 | A1* | 1/2011 | Pradhan ............... G06Q 10/109 705/319 |
| 2011/0191415 | A1 | 8/2011 | Wong |
| 2012/0278165 | A1* | 11/2012 | Mercuri ............. G06Q 30/0261 705/14.53 |
| 2012/0296982 | A1* | 11/2012 | Heyman ................ G06Q 10/06 709/206 |
| 2013/0012233 | A1 | 1/2013 | Stremel et al. |
| 2013/0036166 | A1 | 2/2013 | Dunko |
| 2013/0339453 | A1* | 12/2013 | Aggarwal ............. H04L 51/043 709/206 |
| 2014/0180817 | A1* | 6/2014 | Zilkha .................... G06Q 30/02 705/14.55 |
| 2015/0200981 | A1 | 7/2015 | Garrick et al. |

OTHER PUBLICATIONS

Bowe, Rebecca, "Privacy News Roundup: Facebook, Facewatch, Data Retention About-Face", Oct. 1, 2012, 3 pages.
Kolodziej, Cezar, "2013: The Year of Mobile Continues", Target Marketing Magazine, Dec. 13, 2012, 2 pages.
Hlaing, Soe Min, U.S. Appl. No. 14/154,235, Office Action, dated Sep. 21, 2015, 28 pgs.
Hlaing, Soe Min, U.S. Appl. No. 14/154,235, Final Office Action, dated Apr. 21, 2016, 37 pgs.
Hlaing, Soe Min, U.S. Appl. No. 14/154,235, Notice of Allowance, dated Jan. 4, 2017, 12 pgs.

* cited by examiner

PROVIDING GEOLOCATION NOTIFICATIONS TO INCREASE COLLABORATION BETWEEN USERS

RELATED U.S. APPLICATION DATA

The present patent document is a continuation of U.S. patent application Ser. No. 14/154,235, filed Jan. 14, 2014, entitled "PROVIDING GEOLOCATION NOTIFICATIONS TO INCREASE COLLABORATION BETWEEN USERS", the disclosure of which is incorporated herein by reference.

BACKGROUND

1. Field of the Invention

This invention relates generally to location-based meeting collaboration and, more specifically, to providing geolocation notifications to increase collaboration between users.

2. Description of the Related Art

In the business and sales world, buyers, sellers, co-workers, etc., schedule meetings to discuss business matters. In-person, face-to-face meetings offer the advantages of direct, personal interaction among meeting participants. Online meetings can allow participants to share documents on individual computer screens, and are especially useful for meetings among participants in diverse locations.

However, it can be difficult for collaborators to opportunistically plan meetings with other collaborators. For salespersons, finding new clients and scheduling time with existing ones is difficult. Often, scheduling conflicts or a lack of knowledge and communication about a client's schedule and/or location are barriers to engaging with those clients in a meaningful way. Furthermore, the greater the number of potential meeting participants, the more difficult it can be to select and schedule mutually agreeable meeting times. Further difficulties and frustrations are encountered if one or more collaborators become unavailable, causing the meeting time to be rescheduled. This can result in delays that impact efficiency and hamper forward progress of a collaborative project.

Typically, collaborators can select and schedule meeting times using conventional means, e.g., based on foreseeable opportunities. Computer calendar applications can assist potential meeting participants in selecting common meeting opportunities in the future based on availability information indicated in the calendars. However, comparing calendars can be an iterative, manual process among potential participants, which is repeated if a meeting is to be rescheduled.

SUMMARY OF THE INVENTION

In general, embodiments herein provide geolocation notifications to increase collaboration between users. Specifically, a collaboration tool is configured to receive, from a social media application, an indication of a geolocation of a first user, as well as information about an availability of the first user and an availability of a second user. These are used to generate a collaborative meeting event for the first user and the second user according to the geolocation of the first user, the availability of the first user, and an availability of the second user. The second user is presented with content based on a next-best-action (NBA) model from which the second user selects content to present to the first user, which is then configured for the first user. As such, the collaboration tool unifies user geolocation and availability information in order to connect interested users with one another in a mutually beneficial way.

In one embodiment, there is a method for providing geolocation notifications to increase collaboration between users. In this embodiment, the method comprises the computer-implemented steps of: receiving a geolocation of a first user, information about an availability of the first user from a calendar of the first user and a sentiment of the first user based on social media of the first user; receiving information about an availability of a second user; generating a collaborative event for the first user and the second user based on the geolocation and the availability of the first user and the availability of the second user; presenting the second user with a set of content to provide to the first user, the set of content being organized by a next-best-action (NBA) model; receiving a selection by the second user of content from the set of content to provide to the first user; and configuring the content based on the geolocation of the first user, a time associated with the content, and the sentiment of the first user.

In another embodiment, there is a system for providing geolocation notifications to increase collaboration between users, the system comprising: at least one processing unit; memory operably associated with the at least one processing unit; and a collaboration tool storable in memory and executable by the at least one processing unit, the collaboration tool comprising: a location component configured to receive a geolocation of a first user; a scheduling component configured to: receive information about an availability of the first user from a calendar of the first user and a sentiment of the first user based on social media of the first user; and receive information about an availability of a second user; and a notification component configured to: generate a collaborative event for the first user and the second user based on the geolocation and the availability of the first user and the availability of the second user; present the second user with a set of content to provide to the first user, the set of content being organized by a next-best-action (NBA) model; receive a selection by the second user of content from the set of content to provide to the first user; and configure the content based on the geolocation of the first user, a time associated with the content, and the sentiment of the first user.

In yet another embodiment, there is a computer-readable storage device storing computer instructions, which when executed, enables a computer system to provide geolocation notifications to increase collaboration between users, the computer instructions comprising: receiving a geolocation of a first user, information about an availability of the first user from a calendar of the first user and a sentiment of the first user based on social media of the first user; receiving information about an availability of a second user; generating a collaborative event for the first user and the second user based on the geolocation and the availability of the first user and the availability of the second user; presenting the second user with a set of content to provide to the first user, the set of content being organized by a next-best-action (NBA) model; receiving a selection by the second user of content from the set of content to provide to the first user; and configuring the content based on the geolocation of the first user, a time associated with the content, and the sentiment of the first user.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The invention will now be described more fully herein with reference to the accompanying drawings, in which exemplary embodiments are shown. This disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "computing," "determining," "evaluating," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As mentioned above, embodiments herein provide geolocation notifications to increase collaboration between users. Specifically, a collaboration tool is configured to receive, from a social media application, an indication of a geolocation of a first user, as well as information about an availability of the first user and an availability of a second user. These are used to generate a collaborative meeting event for the first user and the second user according to the geolocation of the first user, the availability of the first user, and an availability of the second user. The second user is presented with content based on a next-best-action (NBA) model from which the second user selects content to present to the first user, which is then configured for the first user. As such, the collaboration tool unifies user geolocation and availability information in order to connect interested users with one another in a mutually beneficial way.

Figure 1:
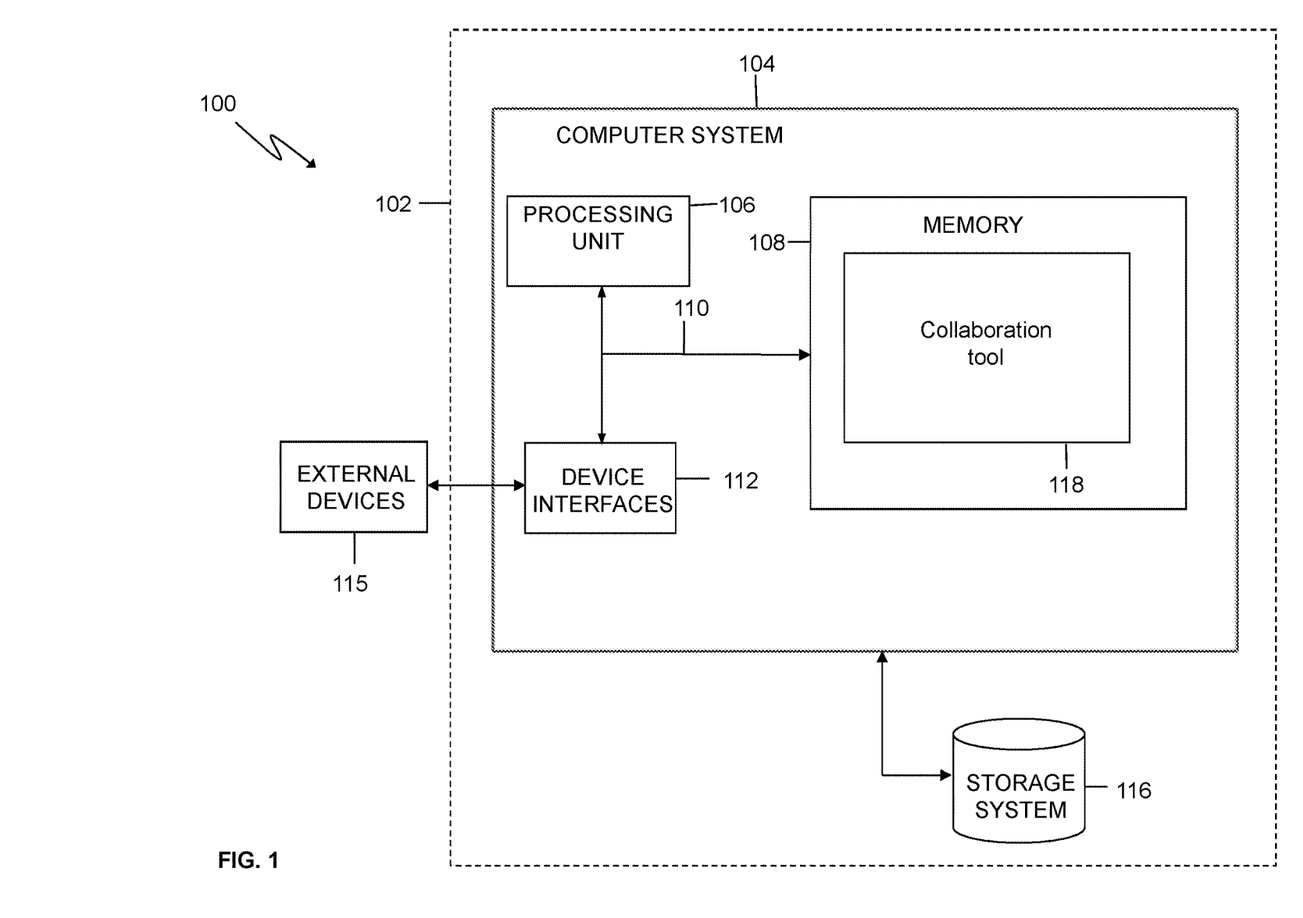
FIG. 1 shows a schematic of an exemplary computing environment in which elements of the present embodiments may operate.

Referring now to FIG. 1, a computerized implementation 100 of the present invention will be described in greater detail. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), a cloud-computing environment, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for providing geolocation notifications to increase collaboration between users. It should be understood that any other computers implemented under the present invention may have different components/software, but will perform similar functions. As shown, computer system 104 includes a processing unit 106 capable of communicating with collaboration tool 118 stored in memory 108, a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing inputs and outputs between external devices 115 and collaboration tool 118. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating collaboration tool 118, which is stored in memory 108 and/or storage system 116. While executing computer program code, processing unit 106 can read and/or write data to/from memory 108, storage system 116, and collaboration tool 118. Storage system 116 can include VCRs, DVRs, RAID arrays, USB hard drives, optical disk recorders, flash storage devices, and/or any other data processing and storage elements for storing and/or processing data. Although not shown, computer system 104 could also include I/O interfaces that communicate with one or more external devices 115 (e.g., a cellular phone, a smart phone, a keyboard, a pointing device, a display, etc.) that enable interaction with computer system 104.

Figure 2:
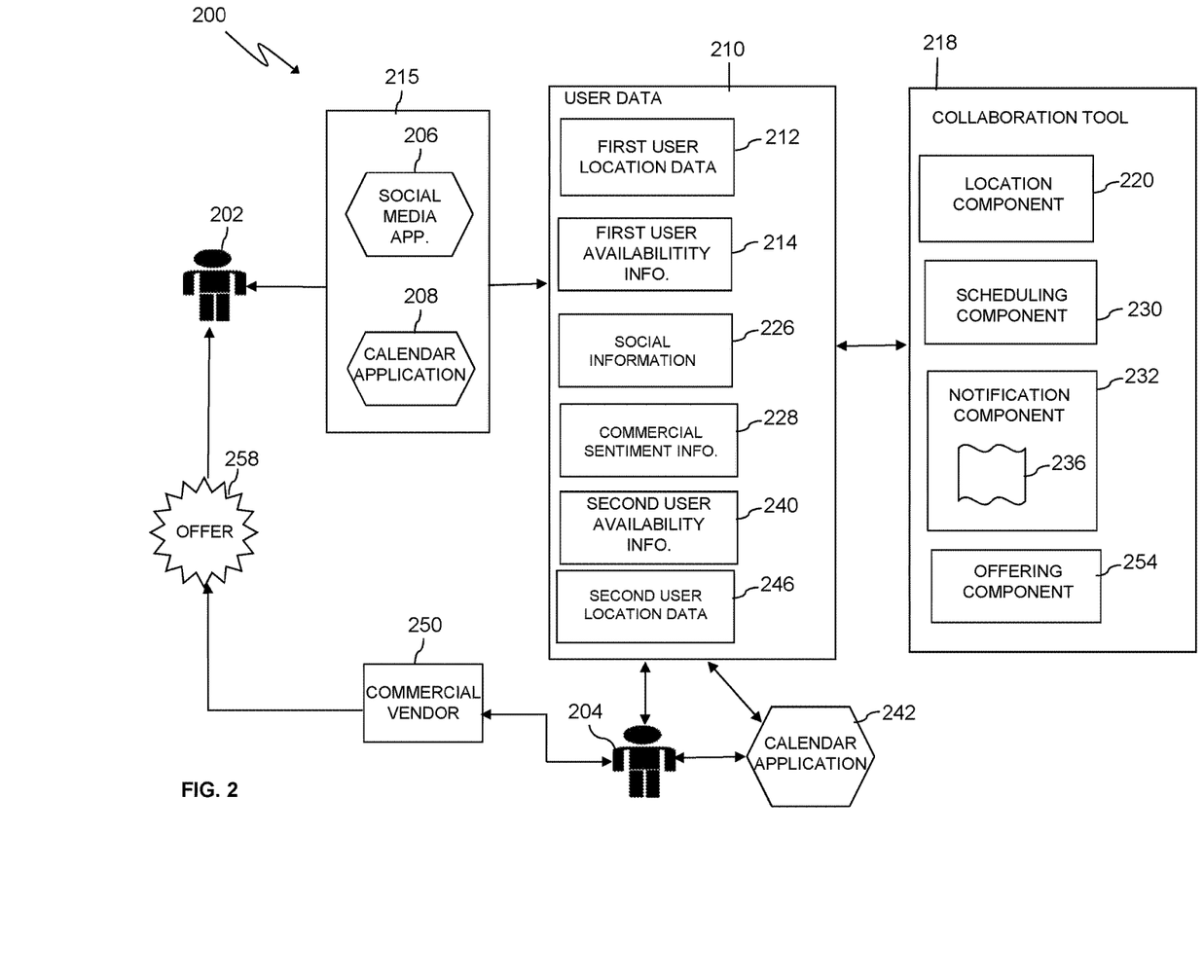
FIG. 2 shows a more detailed view of a collaboration tool according to embodiments of the invention.

Referring now to FIG. 2, operation of collaboration tool 218 will be described in greater detail. As shown, FIG. 2 is a block diagram illustrating system 200 that can be used for implementing collaboration tool 218. System 200 provides the necessary components to provide geolocation-based notifications to increase collaboration between a first user 202 and a second user 204. As used herein, geolocation refers to the physical geographic location of a signal emission device, e.g., a mobile phone, smart phone, wireless computing tablet etc. In an exemplary embodiment, first user 202 may operate a mobile device 215 (e.g., a smart phone), which operates a social media application 206 and a calendar application 208. In one embodiment, social media application 208 may include any of Twitter®, Facebook®, or LinkedIn®, while calendar application 208 may include any of IBM® Lotus Notes®, Yahoo!® Calendar, Microsoft® Office Outlook™, and the like. (Twitter is a registered trademark of Twitter, Inc., having an address at 1355 Market Street, Suite 900 San Francisco, Calif. 94103, Facebook is a registered trademark of Facebook, Inc., having an address at 1601 Willow Road Menlo Park, Calif. 94025, LinkedIn is a registered trademark of LinkedIn Corporation having an address at Stierlin Court Mountain View, Calif. 94043, Lotus Notes is a registered trademark of International Business Machines (IBM) Corporation having an address at 1 New Orchard Road, Armonk, N.Y. 10504-1722, Yahoo! is a trademark of Yahoo! Inc. having an address at 701 First Avenue Sunnyvale, Calif. 94089, and Microsoft Office Outlook are trademarks of the Microsoft Corp. having an address at One Microsoft Way Redmond, Wash. 98052-7329). It will be appreciated that social media application 206 and calendar application 208 may be downloaded and stored on mobile device 215, or may be stored elsewhere and accessed by mobile device 215 via the Internet. In either case, mobile device 215 provides user data 210, including location data 212 and availability information 214 of first user 202, to collaboration tool 218.

In one embodiment, calendar application 208 includes e-mail and instant messaging functionality. Calendar application 208 may also provide presence information, which indicates availability and willingness to communicate on the part of first user 202. It can also include the current and future geographic location and time zone of first user 202. Additionally, conference/work information of first user 202 can indicate current or scheduled conferences in which first user 202 is committed.

As shown, a location component 220 of collaboration tool 218 is configured to receive, from social media application 206, an indication of a geolocation of first user 202. The indication may come from an action within social media application 206 including written text of a posting (i.e., a message describing the location of user 202), a Facebook® or LinkedIn® "like", a Facebook® "check-in" to a location, a picture posted to social media application 206, etc. In one embodiment, permission to access social media application 206 and calendar application 208 is affirmatively granted by first user 202 prior to receiving user data 210 at collaboration tool 218.

In some embodiments mobile device 215 is a location aware device, i.e., capable of delivering information about the physical location of mobile device 215 to another second user 204 and/or collaboration tool 218. Examples of location aware devices include, but are not limited to, a GPS mobile phone, General Packet Radio Services (GPRS) mobile phone, and geo-location tagging on a laptop.

The current location of first user 202 is tracked from at least one of the actions within social media application 206, a GPS-based location, an IP address, triangulation information, and a user-inputted location. The GPS-based location can be obtained from any GPS-equipped device. The IP address is a numerical label that is assigned to any device in a computer network that uses Internet Protocol for communication. In one implementation, the IP address may be extracted from network packets during network browsing. In other implementations, the IP address, along with nearby wireless access points, is gathered and sent to a geolocation service provider. The geolocation service provider then estimates the current location and is shared with the requesting device. Triangulation information is obtained from cellular communications and pinpoints the geographic position of the user. The user-inputted location can be obtained (e.g., when the user browses a website and opts to share the location details).

In some embodiments, the current location of first user 202 can be also tracked by Wireless Fidelity (Wi-Fi) networks by comparing nearby Media Access Control (MAC) addresses. The MAC address is a unique hardware number assigned to a computer connected in a local area network (LAN) or any other network. In other embodiments, the current location can also be tracked by Hypertext Markup Language (HTML) files viewed by the user while browsing the web. Further, in other embodiments, the current location of first user 202 can also be tracked by using Bluetooth® or Radio-frequency identification (RFID) based technologies.

Bluetooth® is an open wireless technology for exchanging data over short distances through short wavelength radio transmissions. RFID is a technology that uses communication through radio waves for the purpose of identification and tracking.

In another embodiment, user data 210 comprises social information 226 (e.g., a listing of other users belonging to an online social/business network of user 202, along with interests, location information, job/activity information, etc., for those users, which may be obtained from social networking application 206). Social information 226 may also comprise a set of mutual contacts between first user 202 and second user 204, which may be beneficial for increasing collaboration among members of each social/business network. User data 210 also comprises commercial sentiment info 228, which may comprise data (e.g., structured and/or unstructured) about first user 202 indicating a history of past transactions and purchasing behaviors, personality traits, an emotional state, etc.

During operation, location data 212, social information 226, and commercial sentiment information 228 of first user 202 is sent to collaboration tool 218 along with availability info 214 received from calendar application 208. Specifically, a scheduling component 230 of collaboration tool 218 is configured to receive availability info 214 for first user 202, and a notification component 232 is configured to notify second user 204 about the location of first user 202 and the availability of first user 202. From this, a collaborative meeting event 236 is generated by notification component 232 for first user 202 and second user 204 according to the geolocation of first user 202, the availability of first user 202, the availability of second user 204, and a location of second user 204. Second user 204 is then automatically notified about the opportunity for collaborative event 236 (e.g., a face-to-face meeting, telephone call, or an online virtual meeting). To accomplish this, availability information 240 of second user 204 is gathered from calendar application 242, and sent to scheduling component 230 along with location data 246 to enable second user 204 to be alerted any time he/she is in near proximity to first user 202. The location of second user 204 may be determined using methods similar to those described above with respect to first user 202. In another embodiment, the location of second user 204 is known, e.g., in the case that second user 204 assigns his/her location and/or is associated with a commercial vendor 250 having a fixed geographic location.

Scheduling component 230 is further configured to notify first user 202 of collaborative event 236, and automatically suggest times and locations for collaborative event 236 to second user 204. Collaborative meeting event 236 is then automatically scheduled within each respective calendar application, e.g., following approval by first user 202 and second user 204. In an alternative embodiment, second user 204 may wish to arrange a "chance" encounter with first user 202. In this case, scheduling component 230 does not notify first user 202 of collaborative event 236 and, instead, only provides this information to second user 204.

As also shown in FIG. 2, collaboration tool 218 further comprises an offering component 254 configured to provide a commercial offer 258, e.g., from commercial vendor 250, based on user data 210. In one embodiment, offering component 254 comprises a next-best-action (NBA) model, i.e., a marketing and advertising model that provides next-best-action decision-making, wherein offering component 254 considers the different actions that can be taken for user 202 and decides on the 'best' one. The NBA (e.g., commercial offer 258) is determined by the attributes (e.g., personality characteristics and identifying information) of user 202 as determined using social information 226 and commercial sentiment information 228, as well as commercial vendor's business objectives, policies, and regulations on commercial offer 258. In one embodiment, this requires some form of decisioning hub (not specifically shown) that leverages decision logic to combine an advertiser's business rules with predictive and adaptive decisioning models to help determine how to target and solicit user 202. The decisioning authority takes into account each user's expectations, propensities, and likely behavior through the use of predictive modeling. The result is one or more commercial offers 258 generated for user 202 or selected from a predetermined selection of commercial offers.

Offering component 254 is configured to then communicate commercial offer 258 to user 202 when user 202 is located within a predetermined proximity (e.g., 2 miles) to commercial vendor 250, wherein commercial vendor 250 may be a retailer identified as being capable of fulfilling commercial offer 258 to user 202. In one embodiment, commercial offer 258 is communicated to user 202 via at least one of: a message generated within social media application 206, a short message-system (SMS) text to mobile device 215, or an electronic message (e-mail) to the mobile device 215.

Offering component 254 also considers a time and/or location of first user 202 to make sure the offer is delivered at the right time and place for maximum effectiveness. To accomplish this, offering component 254 is configured to receive temporal data for an indicator of the transacting opportunity (e.g., a time of posting to social media application 206), as well as spatio data for user 202 (e.g., location of user 202 as determined by location data 212). Commercial offer 258 is then generated by offering component 254 based on the spatio-temporal data associated with first user 202.

In one embodiment, commercial offer 258 is communicated according to a set of communication permission settings established by user 202. Offering component 254 is configured to receive and manage these customer communication permission settings in real time, and support real time validation of the communication permission settings before any interaction with user 202 is executed. As such, user 202 is not inundated with unwanted offers from retailers (i.e., SPAM).

Figure 3:
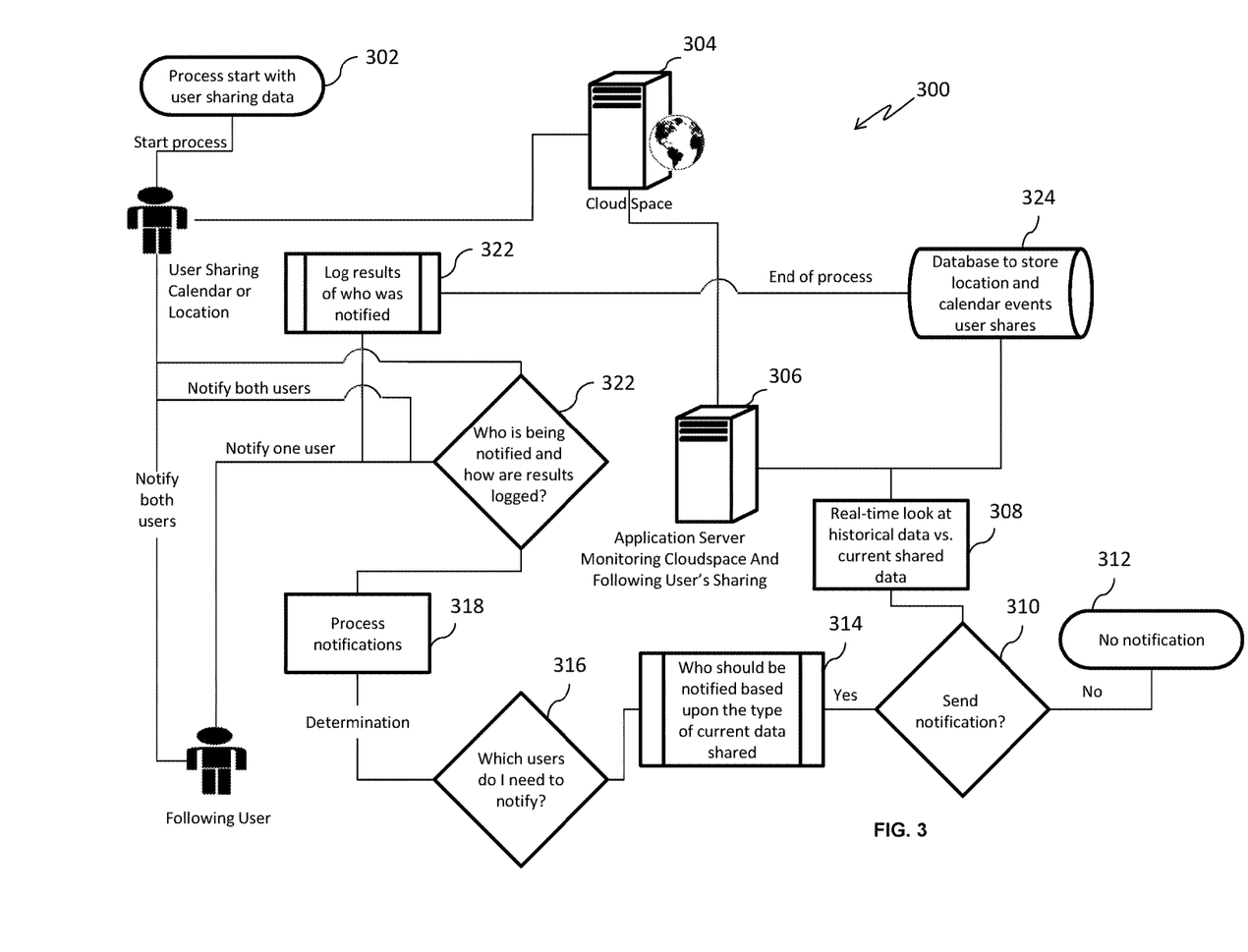
FIG. 3 shows an exemplary implementation of the collaboration tool according to embodiments of the invention.

Referring now to FIG. 3, an implementation of collaboration tool 218 from FIG. 2 will be shown and described. In this non-limiting example, process 300 starts with a user (e.g., first user 202) sharing data at 302, which is received at CloudSpace 304 and subsequently at Application Server 306, which monitors CloudSpace 304 and follows the sharing of the first user. At 308, historical data for the first user is compared to the currently shared data to determine an effective notification. At 310, it is determined whether a notification should be sent. If NO, process 300 ends at 312. If YES, it is determined at 314 who should be notified based upon the type of current data shared, and which users need to be notified at 316. A determination is made, and the notifications are processed at 318. Next, it is determined at 320 who is being notified and how the results are to be logged. Based on the decision, either the following user (e.g., second user 204) or both users are notified, which is then logged at 322. Process 300 then ends, and the location information and calendar events shared by the first user are stored at 324.

Figure 4:
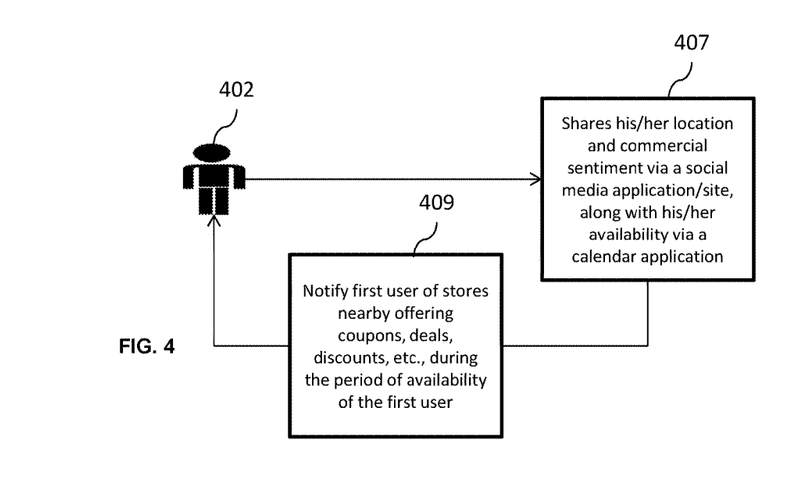
FIG. 4 shows an exemplary use case of the collaboration tool according to embodiments of the invention.

Referring now to FIGS. 4-6, a number of non-limiting use cases will be shown and described. In a first case, as shown in FIG. 4, first user 402 (e.g., a customer/client) shares his/her location and commercial sentiment via a social media application/site, along with his/her availability via a calendar application (407). Using this information, the collaboration tool (FIG. 2) notifies first user 402 of stores nearby offering coupons, deals, discounts, etc., during the period of availability of first user 402 (409). By catering the offering according to the location and availability of first user 402, it is more likely that first user 402 will be able to take advantage of the offering.

Figure 5:
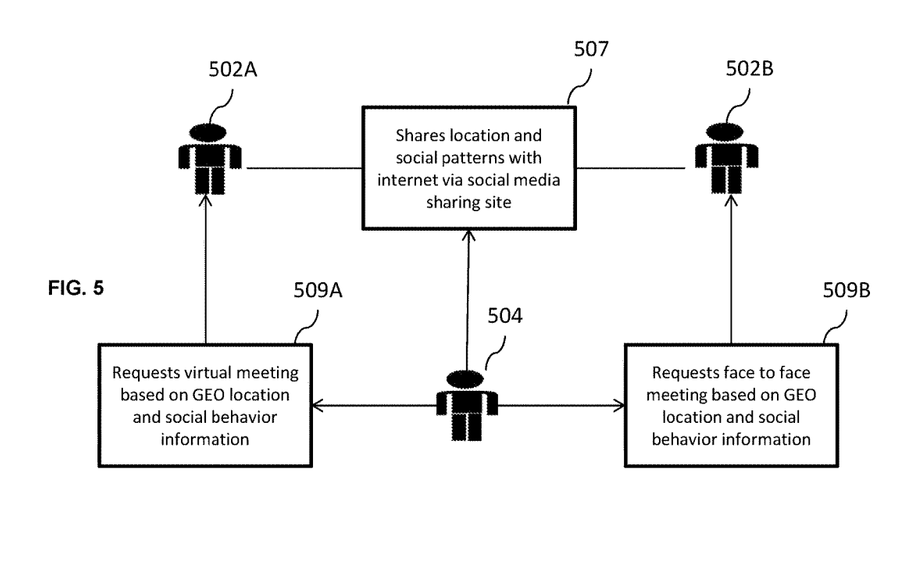
FIG. 5 shows an exemplary use case of the collaboration tool according to embodiments of the invention.

In another case, as shown in FIG. 5, first users 502A-B share geolocation information, availability information, and social information via a social media application/site (507), and second user 504 requests meetings with each user 502A-B. As shown, second user 504 requests a face-to-face meeting with first user 502A based on his geolocation and social behavior information (509A), and requests a virtual meeting with first user 502B based on her geolocation and social behavior information (509B). The virtual meeting with first user 502B may be necessary or more desirable if the geolocation information indicates first user 502B is located far away from second user 504.

Figure 6:
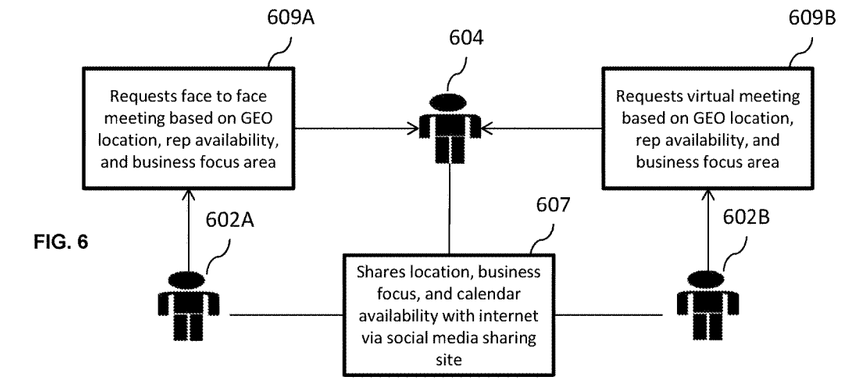
FIG. 6 shows an exemplary use case of the collaboration tool according to embodiments of the invention.

In yet another use case, as shown in FIG. 6, first users 602A-B share geolocation information, availability information, and business focus via a social media application/site (607), and first users 604A-B request a meeting with second user 604. As shown, first user 602A requests a face-to-face meeting with second user 604 based on the geolocation, availability of second user 604, and business focus area (609A), while first user 602B requests a virtual meeting with second user 604 based on the geolocation, availability of second user 604, and business focus area (609B).

Figure 7:
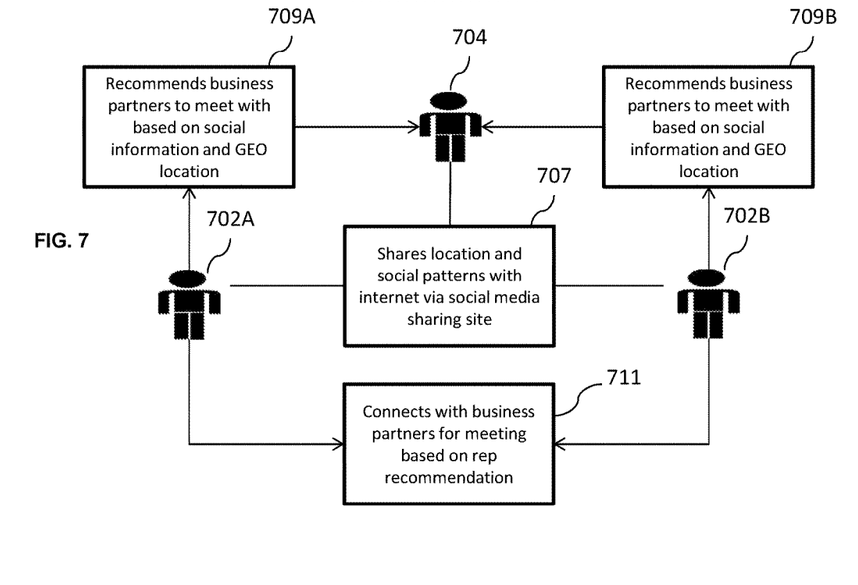
FIG. 7 shows an exemplary use case of the collaboration tool according to embodiments of the invention.

In yet another use case, as shown in FIG. 7, second user 704 facilitates meetings for a third party (e.g., a business partner, mutual friend/colleague, etc.). Here, first users 702A-B share geolocation information, availability information, and social information via a social media application/site (707), and second user 704 requests meetings with each user 702A-B. Next, second user 704 recommends one or more additional users for first users 702A-B to meet with based on the geolocation information, availability information, and social information (709A-B). First users 702A-B may then connect with one or more additional users for a meeting (face-to-face or virtual) based on the recommendation by second user 704 (711). In this embodiment, second user 704 is able to suggest meetings between related or non-related parties of interest based on a mutual connection. Meetings can be suggested regardless of prior interactions between users.

The use cases described above and shown in FIGS. 4-7 may be carried out by computer system 104 (FIG. 1), which may be described in the general context of computer-executable instructions, such as program modules, being executed by a computer. Generally, program modules include routines, programs, people, components, logic, data structures, and so on, that perform particular tasks or implement particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 8:
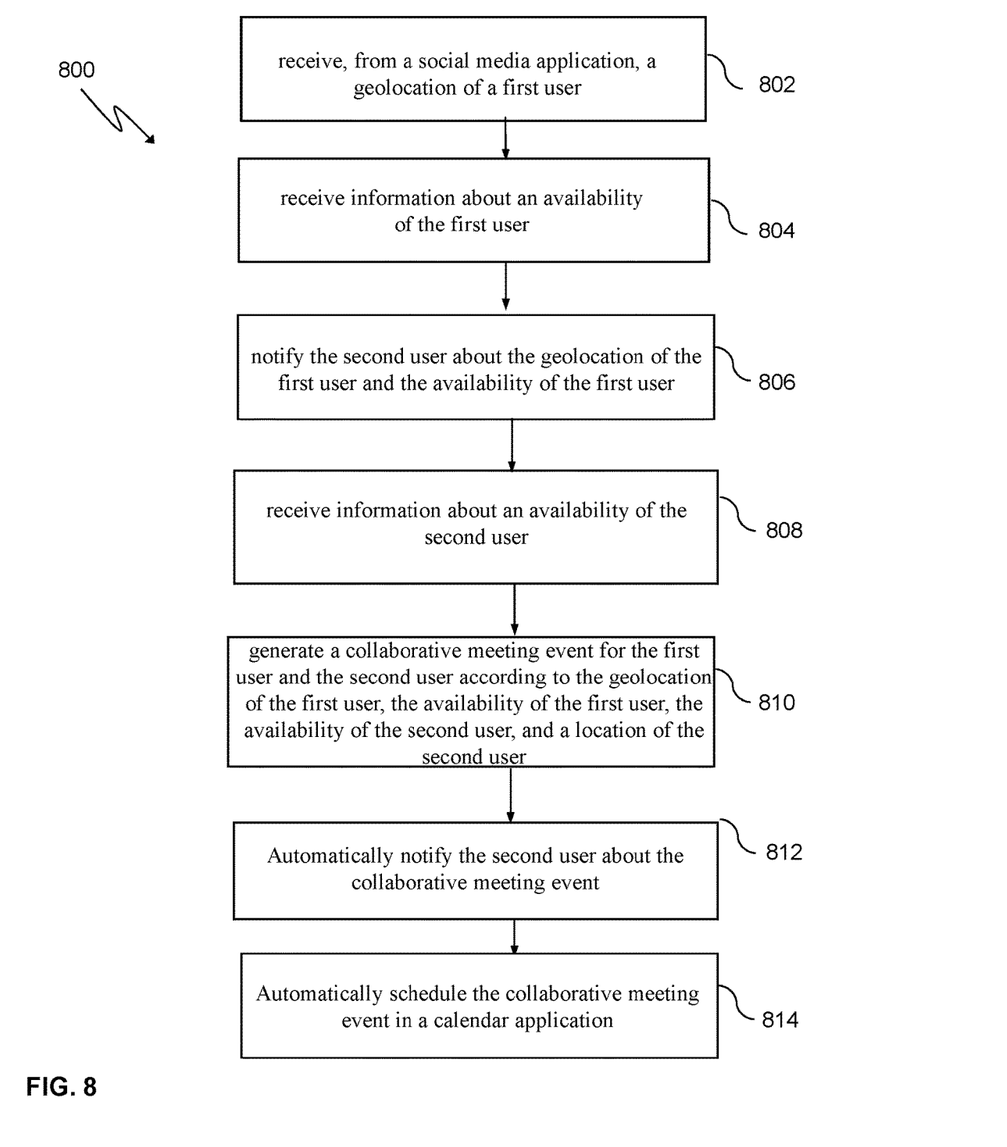
FIG. 8 shows a flow diagram of an approach for providing geolocation notifications to increase collaboration between users according to embodiments of the invention.

The program modules carry out the methodologies disclosed herein, as shown in FIG. 8. Shown is a process 800 for providing geolocation notifications to increase collaboration between users, wherein, at 802, a geolocation of a first user is received from a social media application. At 804, information about an availability of the first user is received, and a second user is notified about the geolocation of the first user and the availability of the first user at 806. Next, at 808, information about an availability of the second user is received, and a collaborative meeting event is generated for the first user and the second user according to the geolocation of the first user, the availability of the first user, the availability of the second user, and a location of the second user at 810. Next, at 812, the second user is automatically notified about the collaborative meeting event, and the collaborative meeting event is automatically scheduled in a calendar application at 814.

The flowchart of FIG. 8 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, as will be described herein, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that, when executed, may cause a processor to perform a corresponding set of operations.

For example, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer-readable storage device" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided an approach for providing geolocation notifications to increase collaboration between users. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for providing geolocation notifications to increase collaboration between users, the method comprising the computer-implemented steps of:
    receiving a geolocation of a first user from a social media application of the first user, information about an availability of the first user from a calendar of the first user and a commercial activity sentiment of the first user based on social media of the first user;
    identifying a second user based on social media content that the first user has in common with the second user;
    receiving information about a location of the second user from a social media application of the second user and an availability of the second user;
    generating a collaborative event for the first user and the second user based on the geolocation and the availability of the first user and the location and the availability of the second user;
    presenting the second user with a set of commercial offer content to provide to the first user, the set of commercial offer content being organized by a next-best-action (NBA) predictive and adaptive decision making model that determines a next-best-action based on attributes of the first user from the social media of the first user and an objective and a policy of the second user;
    receiving a selection by the second user of commercial offer content from the set of commercial offer content to provide to the first user; and
    configuring the commercial offer content based on the geolocation of the first user, a time associated with the commercial offer content, and the commercial activity sentiment of the first user.

2. The method according to claim 1, further comprising notifying the first user about the collaborative event.

3. The method according to claim 1, further comprising automatically scheduling the collaborative event in a calendar application.

4. The method according to claim 1, wherein the collaborative event is one of: a face-to-face meeting, a telephone call, and a virtual meeting.

5. The method according to claim 1, further comprising the first user providing access to social media content of the first user and the information about an availability of the first user.

6. The method according to claim 1, further comprising providing a commercial offer to the first user when the first user is within a geographic proximity to a commercial vendor.

7. The method according to claim 1, wherein the social media content that the first user has in common with the second user comprises a mutual contact among a set of users within a social media application belonging to a network of the first user.

8. A computer system for providing geolocation notifications to increase collaboration between users, the system comprising:
    at least one processing unit;

memory operably associated with the at least one processing unit; and a collaboration tool storable in memory and executable by the at least one processing unit, the collaboration tool comprising:

a location component configured to receive a geolocation of a first user from a social media application of the first user;

a scheduling component configured to:

receive information about an availability of the first user from a calendar of the first user and a commercial activity sentiment of the first user based on social media of the first user;

identify a second user based on social media content that the first user has in common with the second user; and receive information about a location of the second user from a social media application of the second user and an availability of the second user; and a notification component configured to:

generate a collaborative event for the first user and the second user based on the geolocation and the availability of the first user and the location and the availability of the second user;

present the second user with a set of commercial offer content to provide to the first user, the set of commercial offer content being organized by a next-best-action (NBA) predictive and adaptive decision making model that determines a next-best-action based on attributes of the first user from the social media of the first user and an objective and a policy of the second user;

receive a selection by the second user of commercial offer content from the set of commercial offer content to provide to the first user; and configure the commercial offer content based on the geolocation of the first user, a time associated with the commercial offer content, and the commercial activity sentiment of the first user.

9. The computer system according to claim 8, the notification component further configured to notify the first user about the collaborative event.

10. The computer system according to claim 8, the scheduling component further configured to automatically schedule the collaborative event in a calendar application.

11. The computer system according to claim 8, wherein the collaborative event is one of: a face-to-face meeting, a telephone call, and a virtual meeting.

12. The computer system according to claim 8, the location component further configured to receive, from the first user, access to social media content of the first user and the information about an availability of the first user.

13. The computer system according to claim 8, further comprising a commercial offering component configured to provide a commercial offer to the first user when the first user is within a geographic proximity to a commercial vendor.

14. The computer system according to clam 8, wherein the social media content that the first user has in common with the second user comprises a mutual contact among a set of users within a social media application belonging to a network of the first user.

15. A computer-readable storage device storing computer instructions, which when executed, enables a computer system to provide geolocation notifications to increase collaboration between users, the computer instructions comprising:

receiving a geolocation of a first user from a social media application of the first user, information about an availability of the first user from a calendar of the first user and a commercial activity sentiment of the first user based on social media of the first user;

identifying a second user based on social media content that the first user has in common with the second user;

receiving information about a location of the second user from a social media application of the second user and an availability of the second user;

generating a collaborative event for the first user and the second user based on the geolocation and the availability of the first user and the location and the availability of the second user;

presenting the second user with a set of commercial offer content to provide to the first user, the set of commercial offer content being organized by a next-best-action (NBA) predictive and adaptive decision making model that determines a next-best-action based on attributes of the first user from the social media of the first user and an objective and a policy of the second user;

receiving a selection by the second user of commercial offer content from the set of commercial offer content to provide to the first user; and configuring the commercial offer content based on the geolocation of the first user, a time associated with the commercial offer content, and the commercial activity sentiment of the first user.

16. The computer-readable storage device according to claim 15, the computer instructions further comprising notifying the first user about the collaborative event.

17. The computer-readable storage device according to claim 15, the computer instructions further comprising automatically scheduling the collaborative event in a calendar application.

18. The computer system according to claim 15, wherein the collaborative event is one of: a face-to-face meeting, a telephone call, and a virtual meeting.

19. The computer-readable storage device according to claim 15, the computer instructions further comprising providing access, by the first user, to social media content of the first user and the information about an availability of the first user.

20. The computer-readable storage device according to claim 15, wherein the social media content that the first user has in common with the second user comprises a mutual contact among a set of users within a social media application belonging to a network of the first user.

* * * * *